3,257,543
COMBINATION OVEN AND SURFACE UNIT
Donald J. Regan and Robert E. Meiller, both of Hamilton, Ohio, assignors to Whirlpool Corporation, a corporation of Delaware
Filed Oct. 31, 1961, Ser. No. 148,894
2 Claims. (Cl. 219—392)

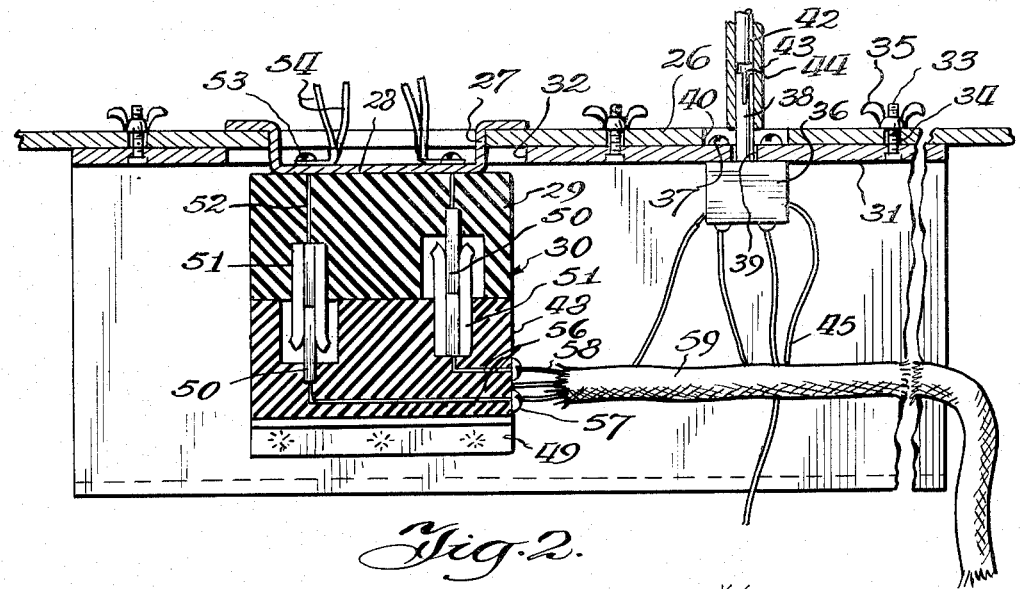

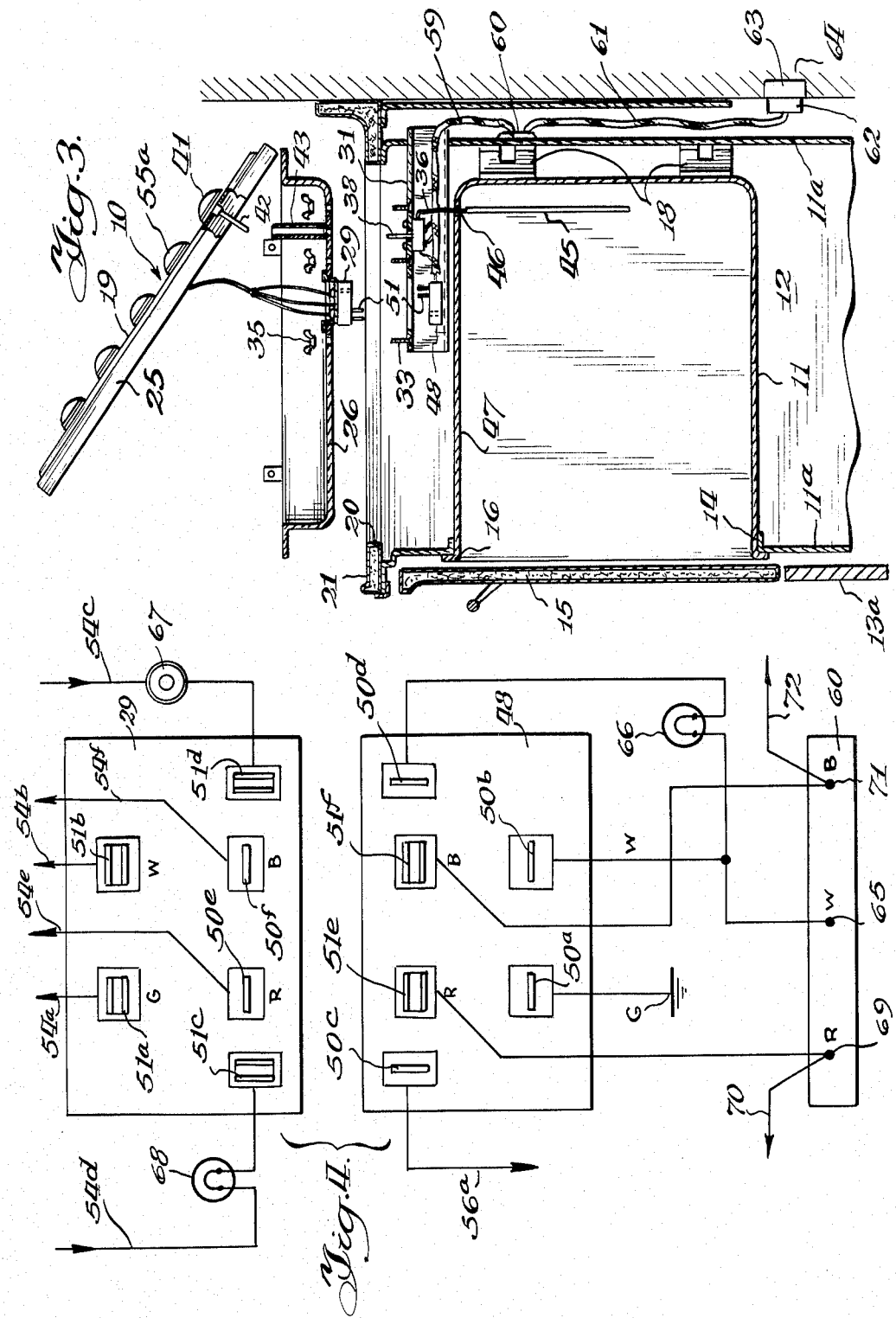

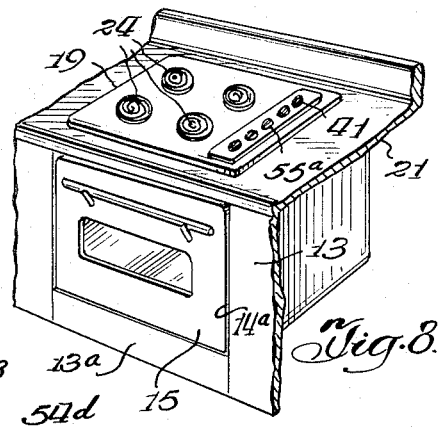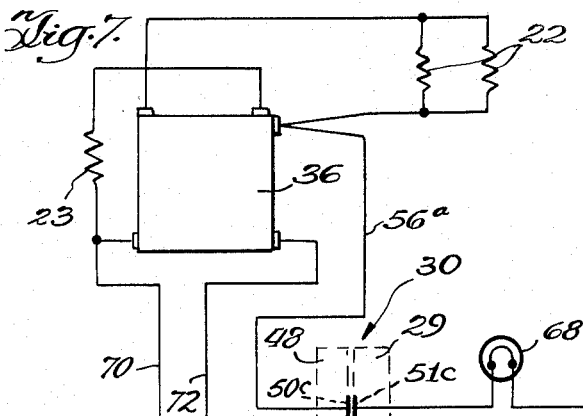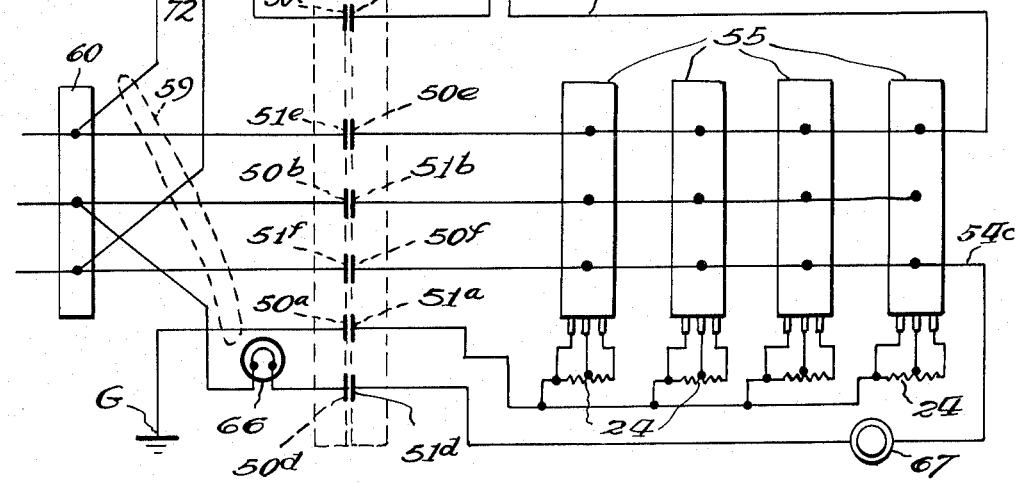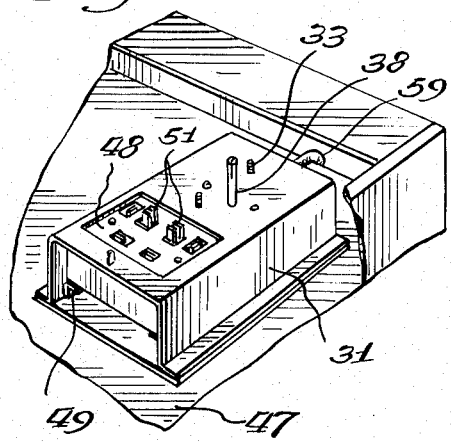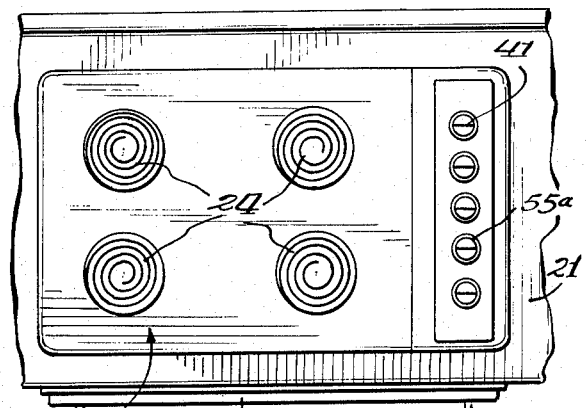

This invention relates to heating means and in particular to oven and range unit combinations.

This invention further comprehends an improved co-operative association of the oven and surface unit positioned in separate base cabinet and counter top openings without necessitating removal of the conventional front edge of the counter top between the units and hence preserves an attractive appearance of an aesthetically clean and functionally unbroken counter top front edge.

Previous combination superjacent range and oven units built into conventional kitchen base cabinets have required an interruption of the front edge of the kitchen counter top receiving the unit. Previous combination superjacent range and oven units have also required complete removal of a counter top to receive such units and have as a result produced cracks, crevices and other openings into which inadvertently spilled liquids or foods may readily pass thereby producing household problems of sanitation and cleanability.

An object of this invention is to provide separate but co-operable superjacent set-in oven and drop-in range units.

A further object of this invention is to provide separate but co-operable superjacent set-in oven and drop-in range units without removing or disturbing the front edge of a kitchen base cabinet counter top supporting the drop-in range unit.

Thus a principal feature of the present invention is the provision of a new and improved combination oven and surface unit.

Another feature of the invention is the provision of such a combination oven and surface unit wherein a continuous kitchen base cabinet counter top is provided to prevent food, liquid and other cooking materials from lodging in cracks, crevices and other openings caused by complete removal of such a counter top.

Another feature of the invention is the provision of such a combination oven and surface unit having new and improved means for facilitated connection and disconnection between the wiring of the oven and surface unit.

A further feature of the invention is the provision of such a combination oven and surface unit wherein a connector is provided having one portion fixedly associated with the oven and another portion fixedly associated with the surface unit, the connector being arranged for readily separable electrical connection between the wiring of the oven and the surface unit without removing any of the wiring or circuit elements of either of the oven and surface unit.

Still another feature of the invention is the provision of such a combination oven and surface unit wherein the connector is arranged to assure a connection of the ground conductors of the wiring of the oven and surface unit at all times when the hot conductors thereof are interconnected.

A yet further feature of the invention is the provision of such a combination oven and surface unit wherein the controls for the oven and surface unit are carried by the surface unit and are connected to the oven through the readily separable connector.

Other features and advantages of the invention will be apparent from the following description taken in connection with the accompanying drawing wherein:

FIG. 1 is a vertical section of a combination oven and surface unit structure embodying the invention;

FIG. 2 is a fragmentary enlarged vertical section illustrating in greater detail the electrical connector thereof;

FIG. 3 is a vertical section generally similar to that of FIG. 1 but with the surface unit removed from association with the oven;

FIG. 4 is a schematic electrical diagram illustrating the connections of the connector;

FIG. 5 is a plan view of the combination oven and surface unit;

FIG. 6 is an isometric view of the lower portion of the connector associated with the oven; and FIG. 7 is a schematic wiring diagram illustrating the electrical circuitry of the combination oven and surface unit.

FIG. 8 is a perspective view of the superposed combination oven and surface unit.

In the exemplary embodiment of the invention as disclosed in the drawing, a combination oven and surface unit structure generally designated 10 is shown to comprise an oven in a range cabinet assembly 11a disposed in a recess 12 in a kitchen base cabinet 13. The range cabinet assembly 11a is disposed of in a recess 12 through a front opening 14a in the kitchen base cabinet 13. A dummy panel 13a or a range drawer (not shown) may be used, as in FIGURE 8, to complete the built-in look. The oven extends through a front opening 14 in the range cabinet assembly 11a and may be provided with a suitable conventional door 15 for selectively closing the front opening 16 of the oven. The oven may be supported on the rear wall 17 of the range cabinet assembly 11a by suitable brackets 18.

The combination structure further includes a drop-in surface unit 19 extending downwardly through an opening 20 in a counter top 21 carried on the kitchen base cabinet 13 to overlie the recess 12. The surface unit 19 rests on counter top 21 and within its width so that the edges of the counter top 21 are continuous and unbroken. The oven, surface unit and range cabinet assembly 11a may be of generally conventional construction including electrical heating means such as oven heating elements 22, a broiler heating element 23, and surface heating elements 24. The surface unit 19 includes a top 25 and a burner box 26 arranged to carry the top 25 as shown in FIGURE 1.

As best seen in FIGURE 2, the burner pan 26 is provided with an opening 27 across which extends a bracket 28 carrying an upper portion 29 of a connector generally designated 30. A U-shaped mounting bracket 31 rests on top of oven 11 and is restrictively movable to extend subjacent the burner box 26. The bracket 31 is provided with an opening 32 aligned with the opening 27 of the burner box for extension therethrough of the bracket 28. Bracket 28 is fixedly attached to burner pan 26. As best seen in FIGURE 2, the opening 32 is substantially larger than the cross section of the connector portion 29. The bracket 31 is secured to the burner box 26 by means of a plurality of studs 33 upstanding from the bracket 31 through a corresponding plurality of holes 34 in the burner box 26. Suitable wing bolts 35 are threaded on the studs 33 above the burner box so as to clamp the bracket 31 to the burner box 26 while permitting ready disassociation thereof when desired.

A thermostat 36 is secured to the bracket 31 by suitable means such as screws 37 and is provided with a shaft 38 extending through an opening 39 in the bracket 31 and an opening 40 in the burned box 26. An oven control knob 41 disposed on surface unit top portion 25 is provided with a depending shaft 42 which is endwise connected to the shaft 38 within a tubular sleeve 43 for effecting control of the thermostat 36. The shafts 38 and 42 are provided with cooperating projection and recess means 44 to permit connection of shaft 42 to shaft 38 by the simple expedient of lowering the shaft 42 and sleeve 43 into association with the shaft 38. As shown in FIGURES 1 and 2, a sensing element 45 extends downwardly from thermostat 36 through an opening 46 in the upper wall 47 of the oven 11 to sense the temperature within the oven.

The connector 30 is further provided with a second, lower portion 48 which is carried on bracket 31 by means of an additional bracket 49. As shown in FIGURES 1 and 2, the brackets 28 and 49 position the respective upper portion 29 and lower portion 48 of the connector 30 in juxtaposition to each other when the surface unit 19 is installed on the counter top 21. Each of portions 29 and 48 of the connector 30 is provided with a plurality of male elements 50 and a plurality of female elements 51. The elements of upper portion 29 are connected by suitable wires 52 to terminals 53 on bracket 28, to which are connected wires 54 leading to a plurality of controls 55 (not shown) carried on the lower surface of the surface unit top 25 and having control knobs 55a. The elments of the lower portion 48 of connector 30 are connected by suitable wires 56 to suitable terminals 57 to which are connected the wires 58 of a cable 59 connected to a terminal block 60 mounted on the rear wall 17 of the range cabinet assembly 11a. A similar cable 61 is connected from terminal block 60 to a plug 62 which may be connected to a suitable power supply outlet box 63 provided in the building wall 64.

As best seen in FIGURES 2, 4 and 6, the male and female elements of the connector portions 29 and 48 are arranged for co-operative interengagement to electrically connect the cable 59 to the wires 54. As shown in FIGURES 4 and 6, the lower connector portion 48 is provided with two pairs of upstanding male elements 50a, 50b, 50c and 50d and two female elements 51e and 51f. The upper portion 29 is provided with corresponding male elements 50e and 50f and female elements 51a, 51b, 51c and 51d. Element 50a is connected to ground G and to the female element 51a which in turn is connected through a wire 54a to the burners 24 when the connector is arranged as shown in FIGURE 2. The male element 50b is connected to a terminal 65 of block 60 and through an oven light 66 to male element 50d. The female element 51b corresponding to male element 50b is connected through a wire 54b to controls 55 and the female element 51d corresponding to male element 50d is connected to an oven light switch 67 which in turn is connected to a wire 54c returning from the controls 55. Male element 50c is connected by a wire 56a to the thermostat 36 and the female element 51c corresponding to male element 50c is connected to an oven indicator light 68 and in turn connected to a wire 54d returning from controls 55. Female element 51e is connected to a terminal 69 of block 60 to which a wire 70 is connected leading to a broiler element (not shown) of the oven. The male element 50e corresponding to the male element 51e is connected by a wire 54e to the controls 55. The female element 51f is connected to the terminal 71 of block 60 which is, in turn, connected through a wire 72 to the oven thermostat 36. The male element 50f corresponding to the female element 51f is connected by a wire 54f to the controls 55.

Thus, combination oven and surface unit 10 is arranged for extremely simple installation and maintenance in the respective base cabinet and counter top. The combination oven and surface unit 10 is installed so that spilled liquids or foods can readily be wiped up from the counter top with a cloth, preventing sanitation and cleanability problems.

Installation of a surface unit 19 on a continuous counter top 21 not only improves sanitation and cleanability but improves the aesthetic qualities of the set-in unit in that the edges of the counter top are unbroken.

As shown in FIGURE 3, the surface unit 19 is readily removable from association with the oven 11 and range cabinet assembly 11a by firstly removing the wing nuts 35 from the studs 33 and then lifting the surface unit upwardly from the counter top. Upper portion 29 of the connector 30 readily separates from lower portion 48 thereof thereby breaking the electrical connection without the need for removing any portion of the electrical wiring from either of the oven or surface unit. Upon completion of the servicing of the surface unit 19, it may be readily reinstalled on the counter top by merely setting the burner box 26 in place thereon to engage the male and female elements of the connector 30. The wing bolts 35 are then reinstalled on the studs 33 as shown in FIGURE 1 and top 25 is set in place to complete the installation.

In the illustrated embodiment, the connector 30 is spaced from the center of the surface unit so that the connection of the two portions thereof can only be made when the surface unit is disposed as shown in FIGURE 5.

As an additional safety feature in the disconnection and connection of the connector portions, it is preferable that the ground and neutral connections be made prior to the connection of the other wires, which are hereinafter referred to as hot wires. To this end, the ground and neutral female elements 51a and 51b are preferably substantially longer than the other female elements. Thus, when the portions 29 and 48 of the connector 30 are brought together, the first connections to be made are between the wire 54a and ground and the wire 54b and the neutral terminal w. When the portions 29 and 48 of the connector are separated, the last connections to be broken are that between wire 54a and ground and 54b and neutral terminal w. Thus, dangerous arcing between the terminal elements of the connector 30 is effectively precluded.

Connector 30 provides facilitated connection of the controls 55 to the power supply and to the heating units of the oven and surface unit structures. Further, the control knob 41 is connected to the thermostat 36 by the readily separable shafts 38 and 42 and sleeve 43 to permit facilitated installation and removal of the surface unit without requiring the disassembly of any portion thereof. Resultingly, complete control of the surface unit burners 22 and the oven heating elements 22 and 23 is provided at the surface unit for optimum accessibility.

While we have shown and described one embodiment of our invention, it is to be understood that it is capable of many modifications. Changes, therefore, in the construction and arrangement may be made without departing from the spirit and scope of the invention as defined in the appended claims.

We claim:

1. A combination oven and surface unit adapted to be installed respectively in a front opening recess in a base cabinet and in an opening in a counter top positioned above the base cabinet, said opening in the counter top being spaced from said front opening of the recess in the base cabinet, said combination oven and surface unit comprising: an electric oven including a range cabinet arranged to be removably positioned in the base cabinet recess and having a portion disposed subjacent said counter top opening; an electric drop-in surface unit arranged to be removably positioned in said counter top opening; electrical wiring severally carried by each of said oven and said surface unit for conducting electrical energy therein to energize said oven and said surface unit; means for separably electrically connecting said oven wiring to said surface unit wiring for ready selective connection and disconnection of said surface unit from said oven without removing any of said wiring from either of said oven and surface unit; and a terminal block on said oven for connection of an electrical supply thereto, said connecting means including a first connector on said oven electrically connected to said terminal block and a second connector on said surface unit having means separably mating with corresponding means on said first connector to conduct electrical energy therebetween.

2. A combination oven and surface unit adapted to be installed respectively in a front opening recess in a base cabinet and in an opening in a counter top positioned above the base cabinet, said opening in the counter top being spaced from said front opening of the recess in the base cabinet, said combination oven and surface unit comprising: an electric oven including a range cabinet arranged to be removably positioned in the base cabinet recess and having a portion disposed subjacent said counter top opening; an electric drop-in surface unit arranged to be removably positioned in said counter top opening; electrical wiring severally carried by each of said oven and said surface unit for conducting electrical energy therein to energize said oven and said surface unit; and means for separably electrically connecting said oven wiring to said surface unit wiring for ready selective connection and disconnection of said surface unit of said oven without removing any of said wiring from either of said oven and surface unit, said connecting means including a connector having one portion on said oven and a second portion on said surface unit readily, separably connectable with said one portion, said second portion of the connector being spaced from the center of said surface unit to permit installation of said surface unit in said opening in only one preselected disposition.

References Cited by the Examiner
UNITED STATES PATENTS

| | | | |
|---|---|---|---|
| 2,393,879 | 1/1946 | Barnsteiner | 126—39 |
| 2,525,030 | 10/1950 | Genlott | 219—451 |
| 2,798,930 | 7/1957 | Frost | 219—392 |
| 2,810,057 | 10/1957 | Nolan | 219—451 |
| 3,002,079 | 9/1961 | Smith et al. | 219—451 |
| 3,015,712 | 1/1962 | Dills | 219—413 |
| 3,016,444 | 1/1962 | Jasionowski | 219—451 |
| 3,051,160 | 8/1962 | Nielsen | 126—37 |
| 3,087,042 | 4/1963 | Hanson | 219—451 |

RICHARD M. WOOD, *Primary Examiner.*

MAX L. LEVY, ANTHONY BARTIS, *Examiners.*

L. H. BENDER, *Assistant Examiner.*